US006816897B2

(12) United States Patent
McGuire

(10) Patent No.: US 6,816,897 B2
(45) Date of Patent: Nov. 9, 2004

(54) CONSOLE MAPPING TOOL FOR AUTOMATED DEPLOYMENT AND MANAGEMENT OF NETWORK DEVICES

(75) Inventor: Jacob McGuire, San Jose, CA (US)

(73) Assignee: Opsware, Inc., Sunnyvale, CA (US)

( * ) Notice: Subject to any disclaimer, the term of this patent is extended or adjusted under 35 U.S.C. 154(b) by 636 days.

(21) Appl. No.: 09/843,813

(22) Filed: Apr. 30, 2001

(65) Prior Publication Data

US 2002/0161873 A1 Oct. 31, 2002

(51) Int. Cl.[7] .............................................. G06F 15/173
(52) U.S. Cl. ...................... 709/223; 709/203; 709/224
(58) Field of Search ................................ 709/223, 224, 709/203, 245, 217, 218, 219; 707/10, 104

(56) References Cited

U.S. PATENT DOCUMENTS

| | | | | |
|---|---|---|---|---|
| 5,276,863 A | * | 1/1994 | Heider ......................... | 709/222 |
| 5,958,010 A | * | 9/1999 | Agarwal et al. ............. | 709/224 |
| 5,978,594 A | * | 11/1999 | Bonnell et al. .............. | 710/17 |
| 6,505,245 B1 | * | 1/2003 | North et al. ................. | 709/223 |
| 6,513,065 B1 | * | 1/2003 | Hafez et al. ................. | 709/224 |

* cited by examiner

Primary Examiner—Mehmet B. Geckil
(74) Attorney, Agent, or Firm—Burns, Doane, Swecker & Mathis, L.L.P.

(57) ABSTRACT

An automated provisioning and management system for network devices includes a library of commands that are generic to all devices of interest, and device-specific plug-ins for implementing those commands in each of the different devices. A user can select any one of the standard commands and have it applied to a particular device of interest in a manner which is capable of being handled by that device. An interface between the library and a source of configuration information, such as a database, enables the various tasks associated with the provisioning and management of network devices to be automatically carried out on multiple devices, thereby minimizing, or even eliminating, the need to manually configure each such device. Various tools are provided to facilitate the ability of support personnel to identify and monitor functions performed by various devices, as well as detect and correct errors in the operation of those devices.

15 Claims, 5 Drawing Sheets

| Firewall | Compartment | IP Address |
|---|---|---|
| FW 450 | ABC Corp | 172.17.4.150 |
| FW 200 | XYZ Inc | 172.17.5.90 |

*Fig. 6A*

| Protocol | Local Address | | Remote Address |
|---|---|---|---|
| udp | PUBLIC pool in DC1 | snmp | joe.abc.com |
| tcp | SERVER pool in DC1 | www | NET1 |
| tcp | Public pool in DC2 | www | NET3 |

*Fig. 6B*

| | Network Name | Network IP |
|---|---|---|
| ☐ | netmon.sc1.www.net | 64.14.167.128 |
| ☐ | netmon.sc1.net | 64.14.167.144 |
| ☐ | netmon.sc1.server.net | 172.16.62.46 |

| Protocol | ☐ UDP    ☐ TCP |
|---|---|
| Port | |
| Network | |

[ADD]

*Fig. 6C*

CONSOLE MAPPING TOOL FOR AUTOMATED DEPLOYMENT AND MANAGEMENT OF NETWORK DEVICES

FIELD OF THE INVENTION

The present invention is directed to the deployment and management of devices that control the transmission of data over a network, such as switches, routers, firewalls, load balancers, and the like, and more particularly to a system and method that provides for automated deployment and management of a variety of different types of such network devices.

BACKGROUND OF THE INVENTION

Related, co-pending application Ser. No. 09/699,329 describes a framework for automatically provisioning devices, particularly servers, which provide resources on communication networks such as the Internet and intranets. These devices might function, for example, as web servers, application servers and/or database servers that supply the information and functionality associated with a website. The framework described in the foregoing application employs agents that are resident on each of the servers, to facilitate the automated provisioning, configuration and monitoring of the servers. The agents communicate with other components of the provisioning framework, and perform tasks such as automatically loading software onto the servers, configuring the servers, and reporting information about the status of the servers.

In addition to the servers which provide the resources and functionality associated with a website, the infrastructure of a website includes other devices whose principle function is to manage and control the transmission of data between the servers and the remaining portions of the communications network. As disclosed in the aforementioned application, for example, these other devices may include firewalls, load balancers, switches and routers. In the context of the present invention, these types of devices which manage the flow of data associated with a website are collectively referred to as "network devices." The provisioning and configuration of these types of devices present some operational issues that are different from servers, and therefore automation of such tasks may require an approach which departs from the framework described in the previously cited application.

For example, a server is designed to be loaded with various items of software that are selected, and configured, by the user, such as the operating system, application programs, and the like. Due to the nature of their design, it is feasible to load an agent on each server which has the capability to control the server at its most fundamental access level, often known as the "root" level. When access is available at this level, automated provisioning and configuration can be readily accomplished through the agent, for example as described in the previously referenced application. In contrast to servers, network devices typically have proprietary operating systems which may not be designed to be accessed at the root level by the end user. As a result, it is not feasible to load agents onto such devices for the purpose of controlling them at a level necessary for automatic configuration. Rather, each device must be configured by means of an associated communication interface that is used to send specific commands to it.

As a further complicating factor, the different types of network devices that may be employed with a website, or other network resource, may utilize different types of communication interfaces. For example, some devices may include a serial console that presents a command line interface via which the user logs onto and enters commands for the device. Other devices permit the user to access them over the Internet by means of the Telnet protocol. This protocol enables the user to link to the device from a remote computer, and presents a command line interface via which the user can configure the device. Still other examples of interfaces that are employed in connection with network devices include graphical web interfaces and the Simple Network Management Protocol (SNMP).

Furthermore, even if different types of devices, such as a switch, a firewall and a router, all employ the same form of communication interface, e.g., Telnet, the specific features of the interface itself will differ among the various devices, because they each serve a different purpose. In other words, the commands that are used to configure a switch may not be the same as the commands for a firewall, because they have different types of operations and therefore need to be configured differently.

From the foregoing, therefore, it can be seen that the variety of different types of network devices, coupled with the different forms of interfaces associated with these devices, presents significant complexity when attempts are made to automate the provisioning and configuring of these devices. Furthermore, the proprietary operating systems associated with these devices place further constraints on the automation, due to the limitations associated with accessing the devices. It is an object of the present invention, therefore, to provide a system which enables a variety of different types of network devices to be deployed and managed by means of a single interface that is readily applicable to all of the different devices.

SUMMARY OF THE INVENTION

In accordance with the present invention, the foregoing objective is achieved with an automated provisioning and configuration system for network devices that comprises two main features. One of these features consists of a library of commands that are generic to all devices of interest, and device-specific plug-ins for implementing those commands in each of the respective devices. By means of this feature, a user can select any one of the generic commands and have it applied to a particular device of interest in a manner which is capable of being handled by that device.

The second main feature of the system comprises an interface between the library and a source of configuration information, such as a database. By means of this interface, the various tasks associated with the provisioning and management of network devices can be automatically carried out on multiple devices, thereby minimizing, or even eliminating, the need to manually configure each such device.

As a further feature of the invention, various tools are provided to facilitate the ability of support personnel to identify and monitor functions performed by various devices, as well as detect and correct errors in the operation of those devices.

These and other features and advantages of the invention are explained in detail hereinafter with reference to exemplary embodiments illustrated in the accompanying drawings.

BRIEF DESCRIPTION OF THE DRAWINGS

FIGS. 6A–6C are exemplary screen displays associated with a tool for managing firewalls;

DETAILED DESCRIPTION OF THE INVENTION

To facilitate an understanding of the principles which underlie the present invention, it is described hereinafter with reference to its application in a system for automatically provisioning the devices which form the infrastructure of Internet websites. Further in this regard, such description is provided in the context of a data center, which typically accommodates the infrastructure to support a large number of different websites, each of which may have a different configuration for its infrastructure. It will be appreciated, however, that the implementation of the invention that is described hereinafter is merely exemplary, and that the invention can find practical application in any environment where the automated provisioning of network devices is desirable. Thus, for example, the principles of the invention can be employed to provision computing devices in the networks of a single enterprise, or any other situation in which there are a sufficient number of computing devices to realize the benefits of automated provisioning and configuration.

In an exemplary environment in which the present invention can be implemented, the infrastructure for supporting a website is housed in a data center, which comprises one or more buildings that are filled with hundreds or thousands of servers and network devices, for hosting a large number of different websites. Typically, each floor of the data center contains numerous rows of racks, each of which accommodates a number of servers and/or network devices. In one type of arrangement, each website that is supported within the data center is allocated a discrete compartment within the center, such that the servers and network devices within that compartment are dedicated to hosting the services of the given site.

Figure 1:
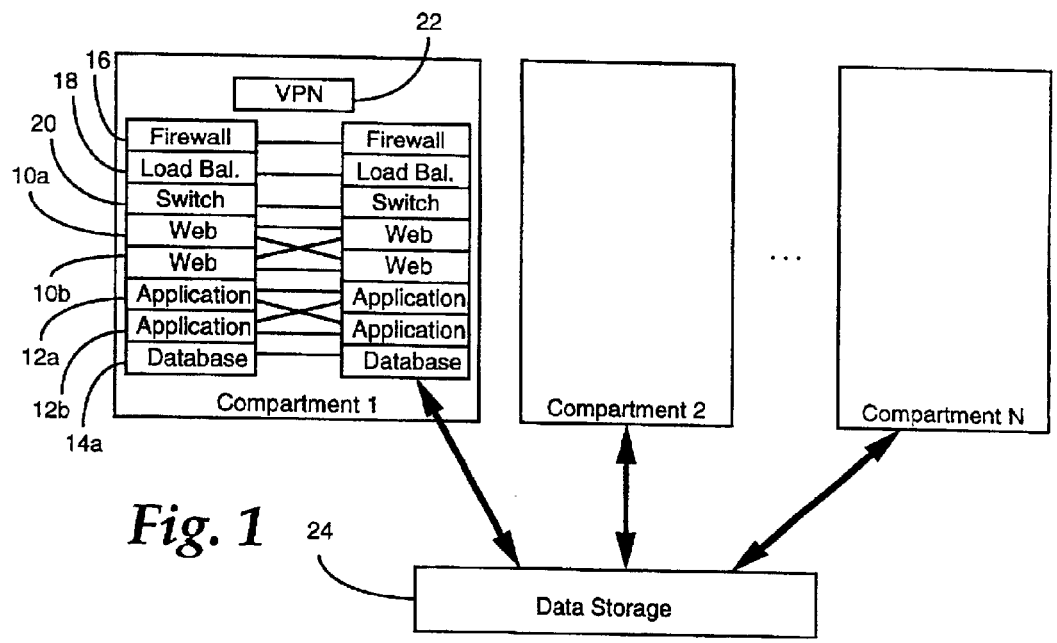
FIG. 1 is a block diagram of one embodiment of the hardware configuration for websites in a data center.

FIG. 1 is a block diagram illustrating this type of configuration. The figure illustrates three exemplary website compartments, each of which accommodates the devices for hosting a respective website. In the illustrated embodiment, each compartment includes one or more web servers 10a, 10b, one or more application servers 12a, 12b, and a database server 14a. The network devices of the website include a firewall 16 to provide security against attacks on the site, a load balancer 18 for efficient utilization of the various servers, and a switch 20 for directing incoming data packets to the appropriate servers. These devices in the website compartment can be securely connected to a support organization's computer system via a virtual private network router 22. The support organization may be the data center owner, or a managed application infrastructure provider. To avoid a single point of failure in the website, additional redundant components are typically included, and like components are cross connected with one another, as illustrated in the figure.

The physical storage devices for storing the data of a website can also be located in the compartment, and be dedicated to that site. In some cases, however, for purposes of efficiency and scalability, it may be preferable to share the data storage requirements of multiple compartments among one another. For this purpose, a high capacity storage device 24 can be provided external to the individual compartments.

Figure 2:
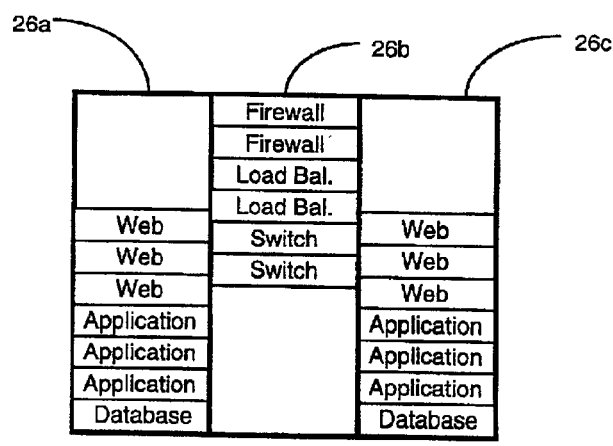
FIG. 2 is a more detailed block diagram of an exemplary configuration for a website compartment in a data center.

In one preferred arrangement, each website compartment is comprised of at least three racks within a data center. Referring to FIG. 2, the two outer racks 26a and 26c contain the server components which provide the functionality associated with the website. For example, each of these two racks may contain one or more web servers, application servers and/or database servers. The center rack 26b contains the network devices that function as an interface between the website servers and external networks. These network devices include switches, firewalls, routers, load balancers and the like. By means of this physical arrangement, the network devices can be easily connected to the servers in each of the two adjacent racks.

To provide the services associated with a website, the software that is resident on each of the devices in a compartment must be configured with the appropriate settings to meet the requirements of the website. In the past, manual procedures were typically carried out to achieve the necessary configuration. Thus, personnel from the support organization were required to separately access each of the individual devices within the compartment, and configure their settings to achieve the desired operation. For instance, a switch must be configured to identify which output port(s) can be connected to each of its input ports, a firewall must have conduits opened between designated internal and external networks, and a router must be configured to select the data transmission protocols that it will handle. Other examples include configuring a load balancer to distribute requests across multiple servers, and configuration of general administrative information such as system logging and time synchronization across all network devices.

In an environment in which multiples of each type of device are included in the compartment, as illustrated in FIG. 2, the amount of time required to manually set up a website increases proportionally. Hence, to the extent that the provisioning and configuration of devices can be automated, the effort required to provision the devices to initially set up a website, and thereafter scale the site according to its data traffic and functionality, is greatly minimized. Furthermore, automation reduces the likelihood that errors will be introduced in the configuration process. A system for automatically provisioning and configuring the servers in a compartment is described in the previously cited application, the content of which is incorporated herein by reference. The present invention is particularly directed to the automated configuration of network devices, such as those in the rack 26b for the example of FIG. 2.

Figure 3:
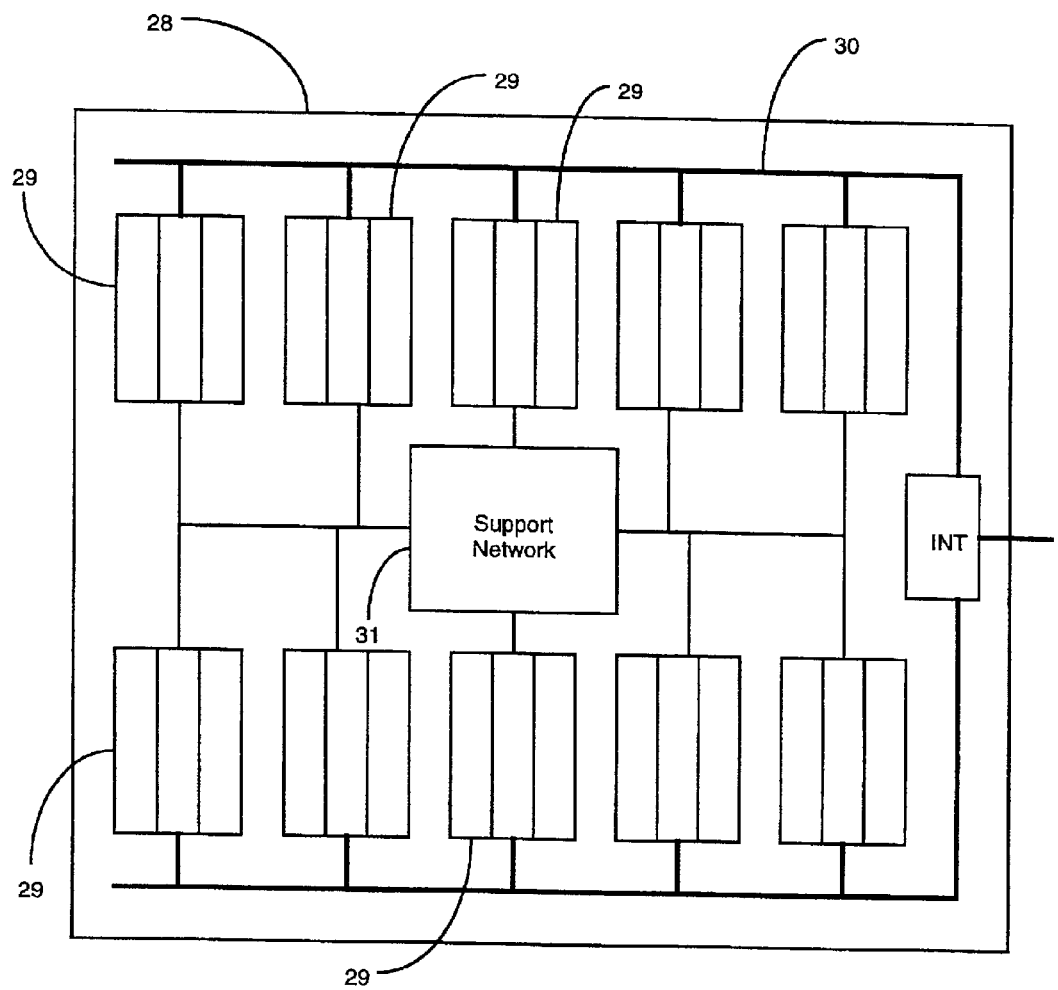
FIG. 3 is a general block diagram of a data center in which the present invention can be implemented.

An overview of an environment in which the present invention can operate is illustrated in FIG. 3. This figure represents a plan view of one floor, or a portion of a floor, in a data center. The data center 28 is partitioned into multiple customer compartments 29, each of which may be arranged as illustrated in FIG. 2. Each compartment is connected to a backbone 30 or similar type of common communication line for access by computers which are external to the data center. For instance, if the compartments are associated with Internet websites, the backbone 30 constitutes the physical communication path via which end users access those sites over the Internet. The backbone may also form the path via which the website hosts can securely communicate with the devices in their individual compartments, for instance by virtual private networks.

Also located in the data center 28 is a support network 31. The devices for this network may be located within another compartment in the data center. This network is connected to the devices in each of the compartments 29 which are to be configured and managed by the organization which controls the support network. In the embodiment of FIG. 3, the support network 31 is illustrated as being connected to the compartments 29 via a communications network, e.g. a LAN, which is separate from the backbone 30. In an alternative implementation, the support network can communicate with the compartments over the backbone itself, using a secure communications protocol.

The support network 31 may be operated by the owner of the data center, or by a third party managed application infrastructure provider. While FIG. 3 illustrates all of the compartments being connected to the network 31, this need not be the case. To this end, multiple support networks may be located in the data center, with each one operated by a separate entity to configure and manage the devices in different ones of the compartments 29. In accordance with the present invention, the support network 31 automatically configures the network devices in each compartment that is associated with the network.

One significant difficulty that is associated with the automated management and deployment of network devices is the fact that each device may present a different type of interface through which its configuration parameters are accessed. The interfaces may differ by means of the manner in which communication is established with the device, and/or the set of commands that are used to configure the device. As described previously, communication with the devices may be carried via a Telnet connection, a serial console, a web interface, or SNMP. Further, since each type of device has different functionality associated with it, the particular parameters that need to be configured, and the commands for setting those parameters, will vary from device to device. Hence, an automated system for managing and configuring network devices must be capable of handling the differing requirements of the various devices.

Figure 4:
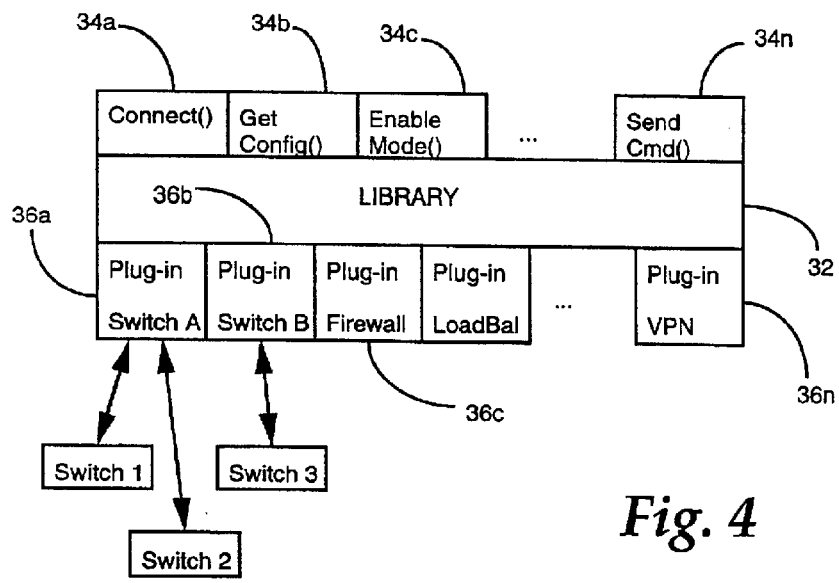
FIG. 4 is a block diagram of a command library in accordance with one feature of the present invention.

In accordance with one feature of the present invention, these requirements are handled by means of a library of commands that are generic to all devices, and associated device-specific plug-in modules for implementing the commands on particular devices. Referring to FIG. 4, a routine library 32 has an associated set of commands 34a–34n that are defined for all of the network devices to be managed by the support network. The following list contains an exemplary set of commands that might be associated with such a library:

connect( )—establishes a connection to a network device through which configuration commands can be sent and information can be retrieved.

get_config( )—retrieves the current configuration of a network device by executing appropriate commands on the device (eg. "show config", "get config", "/cfg/dump").

enable_mode( )—using an established connection to a device, this command puts the device into the most privileged (e.g., root) level.

dump_config( )—post-processes the configuration retrieved from the device to render it suitable for storage in a version control system and saves it to the local file system.

config_mode( )—using an established connection at the enabled level, this command puts the device into a mode where it can accept configuration commands, if appropriate.

send_cmd( )—a "building block" command used to send an individual command to a device if there is not a higher-level method to achieve the desired result. It can be called by all of the above commands.

init_from_file( )—gives a brand new device a complete configuration based on information from a stored configuration file.

Connected with the library are a set of device-specific plug-in modules 36a–36n. A plug-in module is provided for each type of network device to be managed. Thus, in the illustrated embodiment, a plug-in module 36a is provided for switches, another plug-in module 36c is provided for firewalls, a module 36n is provided for VPN routers, etc. In some cases, different devices of the same type may have different interface requirements. For example, different vendors of the same type of device may employ different sets of commands for configuring their respective devices. In a such case, a separate plug-in module is provided for each device having different interface requirements. For instance, as illustrated in FIG. 4, a first plug-in module 36a for switches is connected to Switch1 and Switch2 which may have been obtained from a first vendor. A second plug-in module 36b is associated with Switch3, which may have been obtained from a different vendor. Each of the plug-in modules functions to convert the generic set of commands 34 associated with the library 32 into commands that are specific to the device(s) to which they correspond.

In operation, therefore, the library 32 and the plug-in modules 36 provide a universal interface via which users can manage each of the different types of network devices that may be of interest. For example, a user may issue the command "get_config (switch1)". In response to receipt of this command, the library 32 determines the particular plug-in module that is associated with Switch1. In the illustrated embodiment, this is module 36a. The get_config command is provided to the module, and the module functions to translate this command into the equivalent command for the switch which achieves the desired operation, e.g., obtain the configuration parameters of the device. In some situations, the device-specific command may have the same format as the generic command provided from the library, in which case no translation is necessary, and the plug-in module simply passes the command along to the device. In transmitting the command to the device, the plug-in module also takes into account the particular protocol that is required for communicating with the device. For example, if a Telnet connection is to be employed, the plug-in module formats the command in accordance with the Telnet protocol, and then sends it to the device.

In response to the command, the device performs the requested operation and returns the appropriate response. In the example given above, the response would be a listing of the specific settings for each of the configuration parameters of the switch. Upon receipt of the response, the plug-in module processes the data to place it in a generic format. For example, the plug-in module may strip away headers associated with the Telnet protocol. The module then presents the data to the library 32, which returns it to the user who issued the command.

Figure 5:
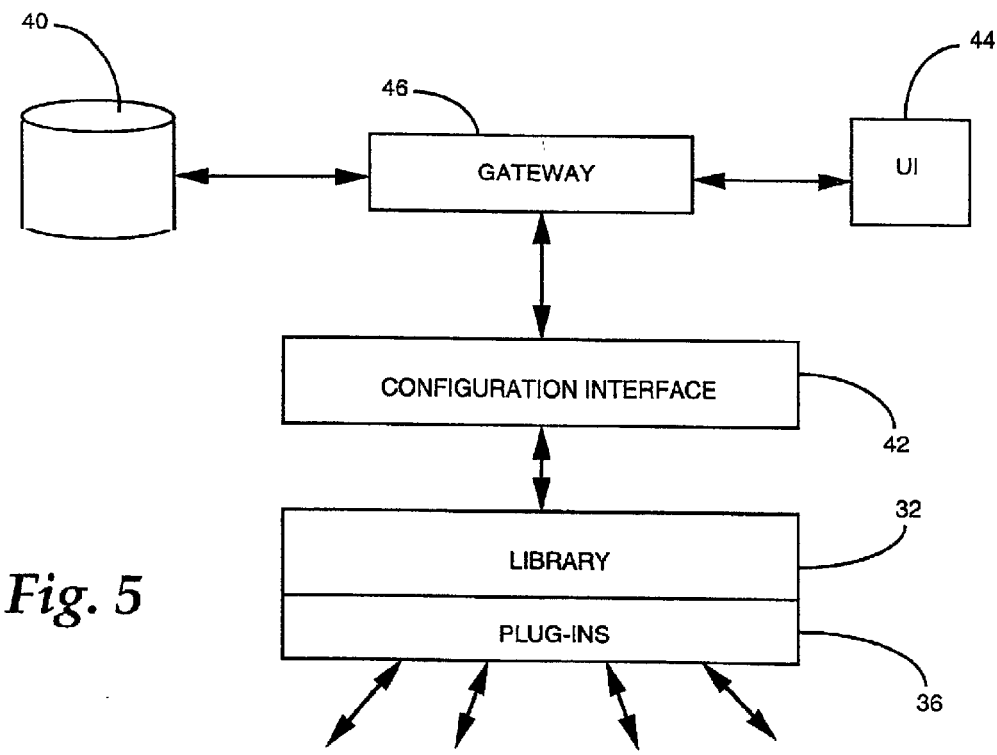
FIG. 5 is a block diagram of a system for the automated provisioning and configuration of network devices in accordance with the present invention.

Another feature of the invention comprises a mechanism for automatically configuring the network devices in a compartment to set up a website. This feature of the invention is implemented by creating a model or template for each device that is to be configured. Referring to FIG. 5, these models are stored in a central database 40. A configuration interface 42 communicates with each of the database 40 and the command library 32 to cause configuration tasks to be automatically implemented. The designation of the devices in a compartment to be configured, and the initiation of the configuration process, is controlled through a suitable user interface 44.

Within the database 40, the configuration model for each device is stored as a list of values to which each configuration parameter in the device is to be set and, where appropriate, the specific sequence in which the adjustments of these parameters are to take place. In operation, when the network devices in a compartment are to be provisioned, the identification of these devices is entered via the user interface 44. Such identification may be in the form of an IP address, a device name, or any other suitable identifier which enables each device to be uniquely designated. They can be manually entered by a user, or selected from a list of known devices stored in the database 40.

Upon receiving the identification of a device, the configuration interface 42 retrieves the model for that device from the database 40, and presents the information from that model as a series of commands to the library 32. For example, each parameter setting may be used to construct a separate command, and these commands are stored in a queue. The queue can be stored in the database 40, or the configuration interface 42. The commands are retrieved from the queue one at a time, and presented to the library 32. As described previously, the library causes the commands to be transmitted to the designated device in the appropriate format, by way of the plug-in module that corresponds to the device. As each command is executed, the device responds with information to that effect, whereupon the interface 42 selects the next command from the queue, to be presented to the device. In this manner, each device can be automatically configured, in accordance with the model stored in the database 40.

By automating the configuration of the network devices in this manner, the present invention provides several advantages. First, since the automated procedure eliminates the need to manually set the values for each of the configuration parameters, the entire process can be carried out quickly and efficiently. Each command in the queue is executed as soon as a response is returned from the previous command, and hence there are no delays between the settings of the individual parameters. Furthermore, since the same set of commands is used to configure all of the devices of a given type, assurance is provided that each of the devices is configured in the same manner. Thus, with reference to the example of FIG. 2, each of the two firewalls will be identically configured. Similarly, each of the two load balancers will have the same settings, as well as each of the two switches. Hence, the likelihood of errors, due to manual setting of each of the devices individually, can be eliminated.

When a device is configured by using the library 32, the information pertaining to the device is automatically added to the central database 40 by the interface 42. In addition, the system can be used to add information about legacy devices that may not have been automatically configured. For example, the user may only need to enter the IP address of the device, and its type, e.g. router, firewall, etc. The type might be entered, or selected, in the form of a specific vendor's product name or number. Once this information is entered, the get_config( ) command can be issued to obtain all of the appropriate information about the device, which is then forwarded to the database to be stored.

In a preferred implementation of the invention, the automated provisioning and configuring system for network devices is integrated with an automated server provisioning system, for example of the type described in the previously cited patent application. With such an integrated system, all of the devices that are present in a website compartment can be automatically provisioned and managed, to thereby minimize the amount of time that is required to assemble the infrastructure necessary to launch a website, as well as minimize the errors associated with such an operation. When this type of integration is employed, the central database 40 and user interface 44 that are used in the system of the present invention can be the same as those which are utilized in the server provisioning framework of the cited application. In this manner, data pertaining to each of the various devices within a website compartment can be interrelated and presented via the interface.

As disclosed in the cited application, communications between the central database, the user interface and agents resident on the servers are carried out by means of a central gateway. When the system of the present invention is integrated into such a framework, this gateway can also be employed to handle the communications between the central database 40, the configuration interface 42 and the user interface 44, as depicted at 46 in FIG. 5. A particular advantage associated with this configuration is that it permits commands to be sent to the network devices from a location remote from the provisioning network 31, e.g. external to the data center. Thus, the user interface 44 can be accessed from any point on the Internet, to configure the network devices, via the gateway 46. In such a configuration, the interface 42 functions as a proxy, and provides a firewall between the network devices and the Internet or other points of remote access.

Once a model has been stored in the central database 40, network devices can be automatically provisioned and/or configured in accordance with the model. There may be instances, however, when manual configuration of a network device is required. For example, when a compartment is first being constructed, the settings of the network devices for that compartment may not be the same as those for other compartments. In such a case, it may be preferable to manually configure a device, and test it, to determine the most appropriate settings. Once these settings have been determined, they are used to establish the model for all other devices of the same type, to enable them to be automatically configured. Even after a device has been provisioned, it may be necessary to manually adjust some of its settings, to determine optimum performance values. Once these optimum values have been obtained, they can be incorporated into the model stored in the database.

As a further feature, the present invention includes a set of tools that facilitate the ability to manually adjust the configuration of a network device. These tools can be stored in the interface 44, and provide a variety of useful information regarding the devices, which information can be stored in the central database 40. In addition, some of the tools provide a graphical environment for the display and adjustment of various device settings. This graphical environment provides two significant advantages. First, it enables the manual adjustment of configuration settings for individual devices to be accomplished through the user interface 44, thereby enabling this user interface to serve as a central location for both the automatic and manual configuration of network devices. Secondly, the graphical environment of the tools makes it easier to understand the parameters that can be adjusted, and facilitates configuration of the devices by less skilled personnel, thereby reducing the cost associated with configuring and managing the network devices.

One such tool relates to the configuration of firewalls. One of the basic functions performed by a firewall to protect a network is packet filtering. In performing this function, the firewall examines a data packet, along with its source and destination IP addresses, and then applies filtering rules to decide whether data from the source IP address is permitted to go to the destination IP address. The data paths via which packets are permitted to travel from a source outside of the protected network to a destination within the protected network are known as "conduits", and they are defined in terms of IP addresses. In a data center, where there may be hundreds or thousands of different network devices and servers, it can be appreciated that there are a considerable number of IP addresses to be managed. Since each IP address consists of a sequence of numbers, it is difficult for personnel in the data center to distinguish different devices from one another simply by means of their IP addresses. Consequently, when configuring the conduits of a firewall, a great deal of attention and skills are required, to ensure that the correct IP addresses are being entered. If the wrong address is entered, security within the network could be compromised.

One of the advantages associated with using a central database 40 is the fact that a great deal of information can be stored about each network device, and be made readily available to the data center personnel. For instance, each device can be given a name which makes the identification of the device significantly more intuitive than using its IP address. Furthermore, each device can be associated with a given compartment or website host.

In accordance with the invention, a tool for configuring and monitoring firewalls employs the data stored in the central database 40 to determine the names and/or other identifying information associated with the IP addresses for which a firewall is configured. FIGS. 6A and 6B illustrate exemplary displays that can be presented by such a tool. Referring to FIG. 6A, a user such as a network engineer may first enter a command in the user interface 44 to list all firewalls associated with the support network 31. In response to such a command, a query is constructed within the gateway 46 and presented to the central database 40. The response to this query contains an identification of all records in which the device type is identified as a firewall. This information is displayed in the form of a table 48 which lists the individual firewalls 50, the compartments in which they are located, e.g. the names of the website hosts 52 associated with the respective compartments, and the IP address 54 of the firewalls. From this list, the network engineer can select the firewall for a given compartment of interest.

Once a particular firewall has been selected, the conduits for that firewall are displayed, for example as illustrated in FIG. 6B. As can be seen, the conduits are not identified by their IP addresses, but rather by a more intuitive form of identification, such as a network name or a device name. By means of this type of display, the engineer is able to readily ascertain whether each of the open conduits refers to the proper device. Thus, for example, if the firewall in one compartment had a conduit which was opened to a server in a different compartment, the engineer would be able to readily identify the fact that the firewall was not properly configured with the correct IP address, and make the appropriate change.

In addition to listing the various conduits, the tool includes a display to permit the engineer to close a conduit or add a new one. FIG. 6C illustrates an example of such a display. This display lists each of the networks that is associated with the website host in whose compartment the firewall is located. A box 56 adjacent each network indicates whether there is an open conduit into that network. It may be desirable to be able to temporarily close a conduit for test purposes, or if an improper security breach has been detected. By clicking on the box 56 adjacent a listed network, a command is sent to the firewall to close that conduit. Once the test has been completed, or the security breach has been closed, the box can be clicked again to reopen the conduit.

The display of the configuration parameters for a firewall in this manner provides a mechanism to more easily understand the configuration of the firewall. As a result, the management of the conduits can be done in a more efficient manner. In addition, since the information is more intuitive, less skilled personnel can more easily manage the configuration tasks, thereby reducing the overall cost associated with management of the network devices.

The display of FIG. 6C can also be used to set up a new conduit. To do so, the user checks the box adjacent the network where a conduit is to be added. The user then selects one or more protocols to be used, e.g. TCP and/or UDP. Text windows are also provided for the user to enter a port number and the external network port and mask to which the conduit is to be opened. Upon clicking an "Add" button 58, a command is sent to the firewall to add a new conduit with the configuration parameters entered by the user.

Another tool provided by the system relates to the procedure for configuring the network devices in a compartment. As described previously, the automatic configuration of these devices is accomplished by means of a model that is stored in the central database 40. Typically, the basic design of the network devices in a compartment can be relatively standardized across all compartments associated with the provisioning network. Hence, the basic structure of the model can be the same for each compartment. However, the IP addresses of the individual devices will vary from one compartment to another. Therefore, one approach for designing a model for a new compartment would be to copy the model for an existing compartment, and change all of the IP addresses to correspond to the devices of the new compartment. However, since the changing of the IP addresses is performed manually, it is subject to errors. Furthermore, this process can consume a significant amount of time, for example a full day for each compartment.

To reduce the amount of time that is required, and minimize the likelihood of errors, a template-driven approach is employed to create the configuration model for a new compartment. For example, a separate template can be created for each type of network device that exists within a compartment. At each location where an IP address is required for the configuration of the device, the template contains a unique variable. The following example illustrates a possible template for a firewall (where "*****" represents fixed data that does not vary among devices of that type):

Firewall Template
*****
*****
*****
ipaddressinside $INSIDE_IP
*****
*****
conduit $SERVER_NET $PROVISIONING 1002
*****

In the foregoing example, the variables "$server_net" and "$provisioning" define the traffic to be permitted through the firewall by identifying the IP addresses and network masks of the source and destination computers.

When a new compartment is to be configured, the network engineer, or the person responsible for such configuration, merely needs to create a record within the central database 40 that identifies the name of each device and an IP address that is to be assigned to that device. Typically, the IP addresses are assigned from a pool of addresses that are made available to the data center or support organization. In assigning the IP addresses, the engineer may select them in sequence from the next ones available in the pool. Once the specific IP addresses have been assigned to the devices for the new compartment, a command can be issued to automatically configure the devices. In response to this command, the configuration interface 42 retrieves the template for each type of device, and queries the database to obtain the IP address information that has been assigned to the devices of the new compartment. These IP addresses are substituted for the appropriate variables within the template, and the resulting data is used in the command queue that is then transmitted to the device to automatically configure it.

By means of this template-driven approach, the time required to configure the devices in a compartment can be significantly reduced. Furthermore, the likelihood of errors is decreased, since the engineer is no longer required to perform a "copy-and-paste" operation to construct the model that is used to configure the device. As a result, the configuration process is not a limiting factor in the deployment of the compartment's devices.

Figures 7, 8A, 8B:
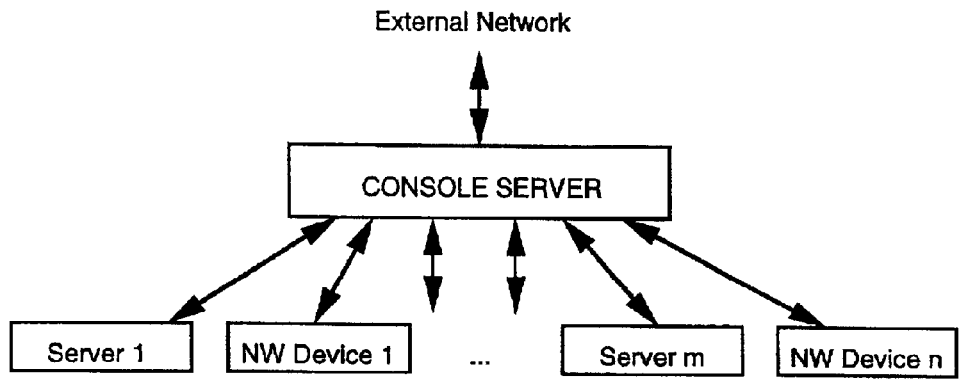
FIG. 7 is a block diagram of a console server and connected devices.
FIGS. 8A and 8B illustrate exemplary displays provided by the console mapping tool.

Another tool provided by the interface is a console mapper. Many network devices and servers have a serial console for management purposes. This console is similar in concept to a keyboard and monitor directly connected to the computer, in that only a bare minimum of software is required for it to function. The console has a different IP address from the device itself, and can be used to display diagnostic information if the operating system crashes or has not yet been installed. The console is usually accessed via a serial cable to a laptop computer (e.g. the same port a mouse or modem plugs into). Specific network devices, known as console servers, aggregate a number of these serial ports together and provide a Telnet interface. These console servers provide an IP address to which users can Telnet and be connected to a particular serial console, as if they had a laptop in the data center and were directly connected. Frequently firewalls prohibit control access over their network ports in the interest of security and require that access be made over the serial console. Referring to FIG. 7, a console server is provided to route the IP addresses of the consoles to the networks 30 and/or 31 external to the compartments. There may be a single console server for an entire data center, but more preferably a console server is included in each compartment for the devices of that compartment.

A difficulty that arises in the management of the compartments is that it is not always known which IP address goes with which device console in the compartment. This information can sometimes be stored in the central database. Due to lax processes however, this information may be outdated. This can happen because once a server is properly configured, it is usually unnecessary to use the serial console unless something goes wrong, so cables can be reconnected improperly without anyone noticing. This situation is further complicated by the fact that the architecture of each compartment may be different from that of all other compartments, and they may change from time to time. As a result, it becomes problematic to keep track of the IP addresses for the consoles all of the time.

To alleviate this situation, the console mapper provides a mechanism by which the user can probe a console server and determine the devices that are attached to its console lines. The user can first call up a list of all of the console servers associated with the support network, or those console servers within a specified range of IP addresses. An example of the result that might be displayed is illustrated in FIG. 8A. This list identifies each of the console servers within the specified range, and the compartment with which it is associated. From this list, the user can select a specified console server, and probe it to obtain the identification of the devices connected to it.

To do so, the console mapper commands the console server to send a Telnet message on each of its lines. In response, the device on the other end of the line responds with a log-in prompt. This prompt is parsed by the console mapper tool to identify its structure and content. From this type of information, it is possible to determine what type of device responded, e.g. a server, load balancer, firewall, etc. It is also possible to distinguish between different operating systems and may also be possible to identify the particular device (via hostname or serial number) over the console. The results are displayed to the user in the form of a table, an example of which is illustrated in FIG. 8B. This table can be provided to the user interface in an HTML format, for example. The results can also be provided to a DNS server, to thereby associate a device name with each IP address. In addition, or alternatively, the results can be stored in the console server itself, so that the device names are available when a user Telnets into the console server itself, for example to fix a problem with the console server.

Preferably, the console mapper is run as a background task on a periodic basis, e.g. once per week, to maintain up-to-date information about the serial consoles associated with each console server.

From the foregoing, it can be seen that the present invention provides the ability to control a variety of different types of network devices through a universal interface. As a result, the complexities associated with the management of a number of different architectural arrangements for web sites and other network resources are minimized. In addition, by providing tools that can supply the user with various types of readily understandable information about the individual devices, as well as simplify configuration tasks associated with those devices, it becomes feasible to delegate such tasks to less skilled personnel, and thereby reduce the costs of managing the devices.

It will be appreciated by those of ordinary skill in the art that the present invention can be embodied in other forms without departing from the spirit or essential characteristics thereof. For instance, while an exemplary embodiment of the invention has been described in the context of provisioning web site servers in a data center, it will be appreciated that the principles underlying the invention can be applied in any environment where computing devices need to be configured and/or updated on a relatively large scale. The foregoing description is therefore considered to be illustrative, and not restrictive. The scope of the invention is indicated by the following claims, and all changes that come within the meaning and range of equivalents are therefore intended to be embraced therein.

What is claimed is:

1. A console mapping tool, comprising:
   means for commanding a console server to send a message to each console connected to said console server;
   means for analyzing a response to said message provided by each console to determine the type of device which transmitted said response; and
   means for displaying a list of device types corresponding to the consoles connected to said console server.

2. The console mapping tool of claim 1, wherein said list of device types includes an identification of the operating system executing on a device.

3. The console mapping tool of claim 2, wherein said list of device types includes an identification of the device.

4. The console mapping tool of claim 1, wherein said response comprises a log-in prompt, and said means for analyzing parses said response to determine the type of device.

5. A console mapping tool, comprising:
- a database storing information regarding each of a plurality of console servers within a network;
- means for retrieving said information and generating a first display containing a list of at least selected ones of said console servers;
- means responsive to selection of one of the console servers listed in said first display for commanding said selected console server to send a message to each console connected to said console server;
- means for analyzing a response to said message provided by each console to determine the type of device which transmitted said response; and
- means for displaying a list of device types corresponding to the consoles connected to said console server.

6. The console mapping tool of claim 5, wherein each of said consoles is located in a compartment associated with a particular entity, and said first display indicates the entity associated with each listed console server.

7. The console mapping tool of claim 5, wherein said list of device types includes an identification of the operating system executing on a device.

8. The console mapping tool of claim 7, wherein said list of device types includes an identification of the device.

9. The console mapping tool of claim 5, wherein said response comprises a log-in prompt, and said means for analyzing parses said response to determine the type of device.

10. A method for mapping a console server, comprising the following steps:
- sending a message from a console server to each console connected to said console server;
- analyzing a response to said message provided by each console to determine the type of device which transmitted said response; and
- displaying a list of device types corresponding to the consoles connected to said console server.

11. The console mapping method of claim 10, wherein said list of device types includes an identification of the operating system executing on a device.

12. The console mapping method of claim 11, wherein said list of device types includes an identification of the device.

13. The console mapping method of claim 10, wherein said response comprises a log-in prompt, and said analyzing step comprises parsing said response to determine the type of device.

14. A method for mapping a console mapping, comprising the following steps:
- storing information in a database regarding each of a plurality of console servers within a network;
- retrieving said information and generating a first display containing a list of at least selected ones of said console servers;
- in response to selection of one of the console servers listed in said first display, issuing a command to said selected console server to send a message to each console connected to said selected console server;
- analyzing a response to said message provided by each console to determine the type of device which transmitted said response; and
- displaying a list of device types corresponding to the consoles connected to said selected console server.

15. The console mapping method of claim 14, wherein each of said consoles is located in a compartment associated with a particular entity, and said first display indicates the entity associated with each listed console server.

* * * * *